(12) United States Patent
Callahan et al.

(10) Patent No.: US 12,551,679 B2
(45) Date of Patent: Feb. 17, 2026

(54) MALE LUER CONNECTOR

(71) Applicant: CareFusion 303, Inc., San Diego, CA (US)

(72) Inventors: Ryan Callahan, Long Beach, CA (US); Corey M. Christensen, Anaheim, CA (US); Yan Fang, Irvine, CA (US)

(73) Assignee: CAREFUSION 303, INC., San Diego, CA (US)

( * ) Notice: Subject to any disclaimer, the term of this patent is extended or adjusted under 35 U.S.C. 154(b) by 880 days.

(21) Appl. No.: 17/859,679

(22) Filed: Jul. 7, 2022

(65) Prior Publication Data

US 2023/0070065 A1    Mar. 9, 2023

Related U.S. Application Data (60) Provisional application No. 63/242,316, filed on Sep. 9, 2021.

(51) Int. Cl.
*A61M 39/10* (2006.01)
*A61M 5/14* (2006.01)

(52) U.S. Cl.
CPC .......... *A61M 39/10* (2013.01); *A61M 5/1413* (2013.01); *A61M 2039/1088* (2013.01); *A61M 2205/586* (2013.01)

(58) Field of Classification Search
CPC .......... A61M 39/10; A61M 2039/1027; A61M 2039/1088; A61M 2039/1083; A61M 2039/1016; A61M 5/1413; A61M 2205/586
See application file for complete search history.

(56) References Cited

U.S. PATENT DOCUMENTS

| | | | | |
|---|---|---|---|---|
| 5,190,534 A | * | 3/1993 | Kendell | B08B 3/048 604/29 |
| 8,287,518 B2 | * | 10/2012 | Kitani | A61M 39/1011 604/533 |
| 10,046,154 B2 | * | 8/2018 | Fangrow | A61M 39/26 |
| 10,695,549 B2 | * | 6/2020 | Roxas | A61M 39/20 |
| 11,628,287 B2 | * | 4/2023 | Buchanan | A61M 39/1011 604/533 |

(Continued)

FOREIGN PATENT DOCUMENTS

| | | | | |
|---|---|---|---|---|
| WO | WO-2015015675 A1 | * | 2/2015 | ......... A61M 39/223 |
| WO | WO-2019177942 A1 | * | 9/2019 | ....... A61M 39/1011 |
| WO | WO-2020066938 A1 | * | 4/2020 | ............ A61M 39/10 |

OTHER PUBLICATIONS

International Search Report and Written Opinion for Application No. PCT/US2022/041243, dated Nov. 17, 2022, 15 pages.

*Primary Examiner* — Cris L. Rodriguez
(74) *Attorney, Agent, or Firm* — MASCHOFF BRENNAN (57) ABSTRACT

A male luer connector is provided that includes a luer slip having a first material, the luer slip sized and shaped to mate with a female connector. A collar is disposed on an outer surface of the luer slip, the collar having a second material and a plurality of first grip features disposed on an outer surface of the collar. A grip is coupled to the luer slip, the grip having a third material and a plurality of second grip features disposed on an outer surface of the grip, wherein one of the plurality of first and second grip features are configured to provide a slip resistant grip surface. Infusion sets and infusion set luer connector assemblies are also provided.

17 Claims, 5 Drawing Sheets

(56) References Cited

U.S. PATENT DOCUMENTS

| | | | |
|---|---|---|---|
| 11,684,720 B2 * | 6/2023 | Anderson | A61M 39/02 604/513 |
| 2003/0184090 A1 * | 10/2003 | Guala | A61M 39/1011 285/332 |
| 2005/0251102 A1 * | 11/2005 | Hegland | F16L 37/0841 604/533 |
| 2006/0129109 A1 * | 6/2006 | Shaw | A61M 39/26 604/246 |
| 2006/0211999 A1 | 9/2006 | Fangrow | |
| 2007/0043334 A1 | 2/2007 | Guala | |
| 2007/0060898 A1 * | 3/2007 | Shaughnessy | A61M 39/10 604/910 |
| 2010/0249723 A1 * | 9/2010 | Fangrow, Jr. | A61M 39/24 604/247 |
| 2011/0282302 A1 * | 11/2011 | Lopez | A61M 39/26 604/246 |
| 2011/0313317 A1 * | 12/2011 | Callicoat | A61B 5/155 600/581 |
| 2012/0191037 A1 * | 7/2012 | Patel | F16K 5/0407 604/246 |
| 2013/0046287 A1 * | 2/2013 | Davis | A61M 39/1011 604/535 |
| 2013/0079730 A1 * | 3/2013 | Mosler | A61M 39/10 604/535 |
| 2014/0243797 A1 * | 8/2014 | Jensen | A61M 39/1011 604/535 |
| 2016/0206516 A1 * | 7/2016 | Kunishige | A61J 15/0026 |
| 2017/0173321 A1 * | 6/2017 | Davis | A61M 5/3134 |
| 2018/0229018 A1 | 8/2018 | Bajac et al. | |
| 2020/0324102 A1 * | 10/2020 | Fangrow | A61M 39/22 |
| 2021/0236795 A1 * | 8/2021 | Hebert | A61K 51/00 |
| 2021/0268254 A1 * | 9/2021 | Zhu | A61M 5/1413 |
| 2022/0265985 A1 * | 8/2022 | Thomas | A61M 39/10 |
| 2022/0288378 A1 * | 9/2022 | Mermelshtein | A61M 39/26 |
| 2023/0226283 A1 * | 7/2023 | Kuracina | A61M 5/345 604/19 |
| 2023/0310824 A1 * | 10/2023 | Shauver | A61M 39/10 604/500 |

* cited by examiner

MALE LUER CONNECTOR

CROSS-REFERENCE TO RELATED APPLICATIONS

This application claims the benefit of priority under 35 U.S.C. § 119 to U.S. Provisional Patent Application Ser. No. 63/242,316, entitled "MALE LUER CONNECTOR," filed on Sep. 9, 2021, the entirety of which is incorporated herein by reference.

TECHNICAL FIELD

The present disclosure generally relates to infusion set intravenous (IV) connectors, in particular male luer connectors.

BACKGROUND

Typical infusion or intravenous (IV) sets are constructed by joining polymeric tubing segments to polymeric components, many of which use luer connectors. These IV sets can be used with infusion pumps or gravity systems to provide fluids to a user, such as a patient. However, typical luer connectors generally achieve an optimized key function by sacrificing another function. For instance, in order to have a better gripping feature, typical luer connectors tend to be bulky and/or have sharp features, which leads to higher costs and negatively affect patient comfort.

For these reasons, it is desirable to provide male luer connectors for use with IV components and IV sets that optimize important aspects of a male luer connector (e.g., connection, disconnection, cleaning and comfort) with one integrated design.

BRIEF DESCRIPTION OF THE DRAWINGS

The accompanying drawings, which are included to provide further understanding of the disclosure and are incorporated in and constitute a part of this specification, illustrate embodiments of the disclosure and together with the description serve to explain the principles of the disclosure.

DETAILED DESCRIPTION

The detailed description set forth below describes various configurations of the subject technology and is not intended to represent the only configurations in which the subject technology may be practiced. The detailed description includes specific details for the purpose of providing a thorough understanding of the subject technology. Accordingly, dimensions are provided in regard to certain aspects as non-limiting examples. However, it will be apparent to those skilled in the art that the subject technology may be practiced without these specific details. In some instances, well-known structures and components are shown in block diagram form in order to avoid obscuring the concepts of the subject technology.

It is to be understood that the present disclosure includes examples of the subject technology and does not limit the scope of the appended claims. Various aspects of the subject technology will now be disclosed according to particular but non-limiting examples. Various embodiments described in the present disclosure may be carried out in different ways and variations, and in accordance with a desired application or implementation.

Figure 1:
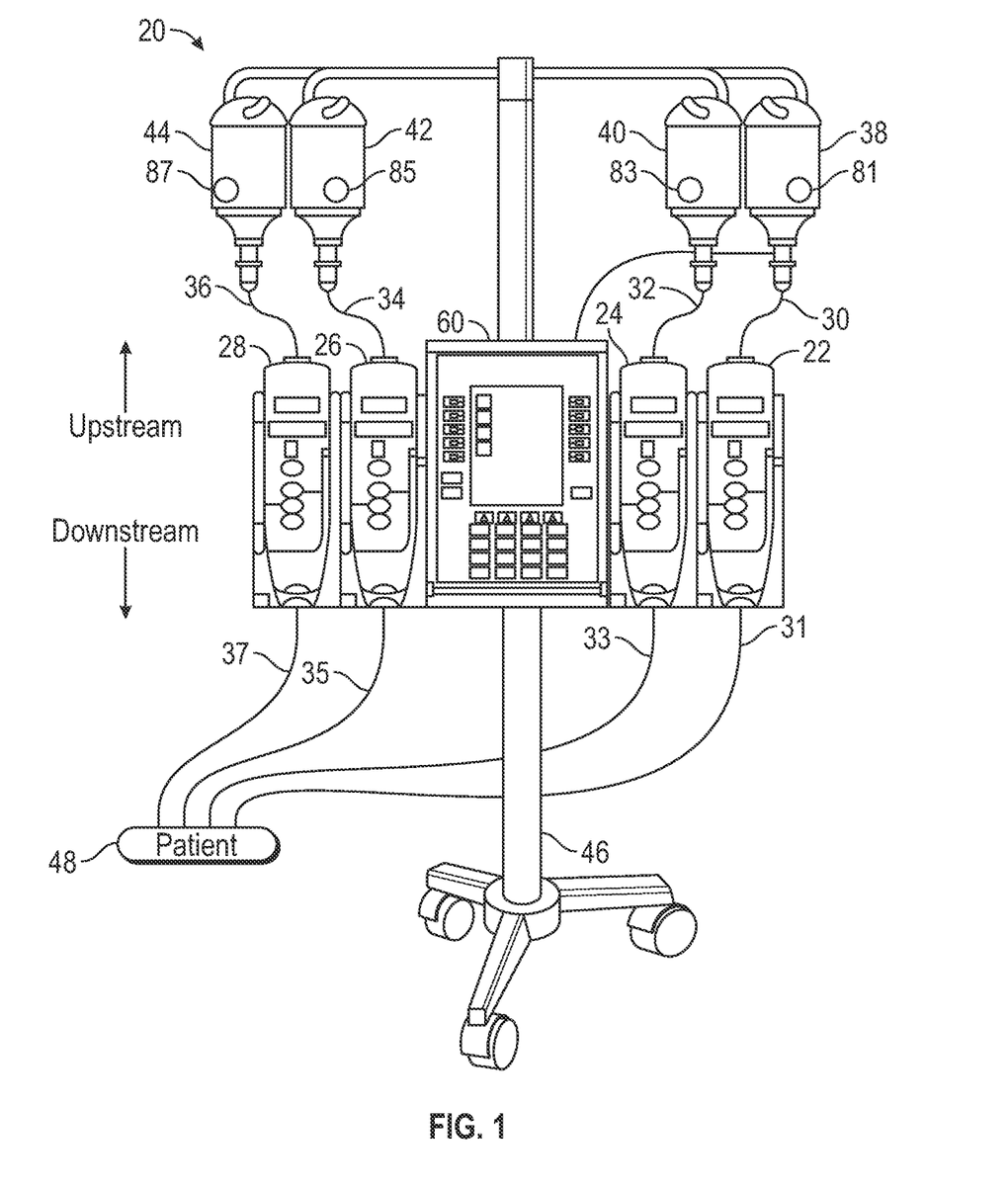
FIG. 1 depicts a perspective view of an example patient care system having four fluid infusion pumps, each of which is connected to a respective fluid supply for pumping the contents of the fluid supply to a patient.

Referring now in more detail to the drawings in which like reference numerals refer to like or corresponding elements among the several views, there is shown in FIG. 1 a patient care system 20 having four infusion pumps 22, 24, 26, and 28 each of which is fluidly connected with an upstream fluid line 30, 32, 34, and 36, respectively. Each of the four infusion pumps 22, 24, 26, and 28 is also fluidly connected with a downstream fluid line 31, 33, 35, and 37, respectively. The fluid lines can be any type of fluid conduit, such as an IV administration set, through which fluid can flow through. It should be appreciated that any of a variety of pump mechanisms can be used including syringe pumps.

Fluid supplies 38, 40, 42, and 44, which may take various forms but in this case are shown as bottles, are inverted and suspended above the pumps. Fluid supplies may also take the form of bags or other types of containers including syringes. Both the patient care system 20 and the fluid supplies 38, 40, 42, and 44 are mounted to a roller stand, IV pole 46, table top, etc.

A separate infusion pump 22, 24, 26, and 28 is used to infuse each of the fluids of the fluid supplies into the patient. The infusion pumps are flow control devices that will act on the respective fluid line to move the fluid from the fluid supply through the fluid line to the patient 48. Because individual pumps are used, each can be individually set to the pumping or operating parameters required for infusing the particular medical fluid from the respective fluid supply into the patient at the particular rate prescribed for that fluid by the physician. Such medical fluids may include drugs or nutrients or other fluids. The infusion pumps 22, 24, 26, and 28 are controlled by a pump control unit 60.

Fluid supplies 38, 40, 42, and 44 are each coupled to an electronic data tag 81, 83, 85, and 87, respectively, or to an electronic transmitter. Any device or component associated with the infusion system may be equipped with an electronic data tag, reader, or transmitter.

Typical infusion sets may also be gravity sets that do not require use of an infusion pump. For example, any of fluid supplies 38, 40, 42, and 44 may be directly connected to the patient 48 via a gravity IV set, wherein gravity causes the fluid to flow through the infusion set and into the patient 48 without the aid of a pump.

Figure 2A:
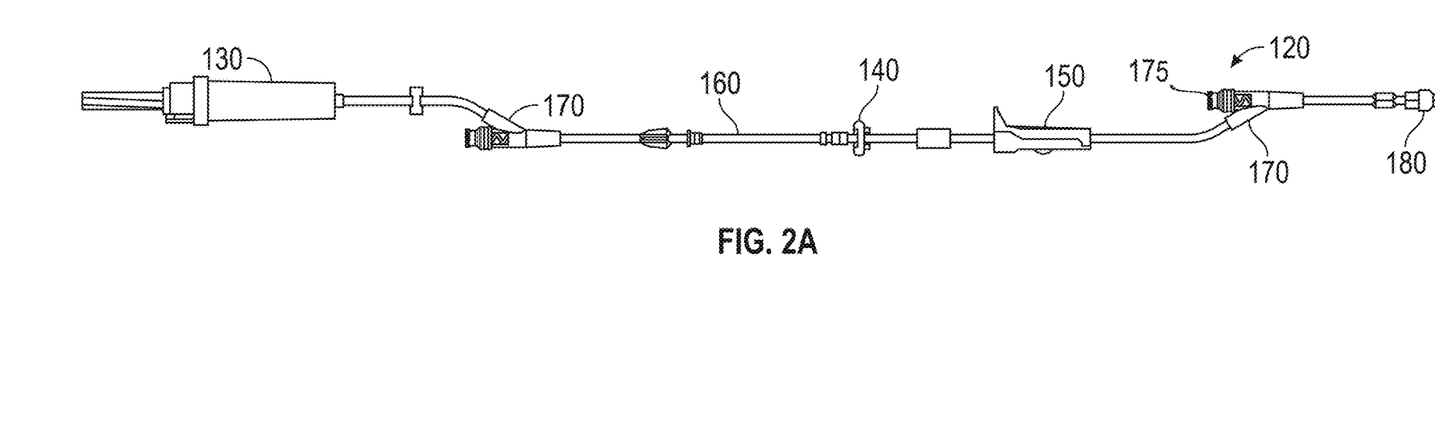
FIGS. 2A-2C are top views of a typical assembled IV infusion set and typical IV extension lines.
Figure 2B:
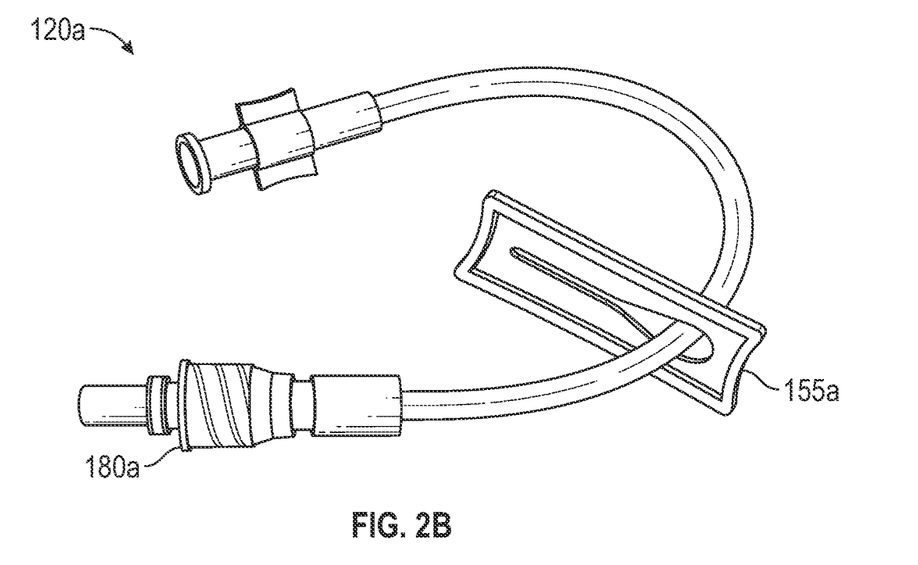
Figure 2C:
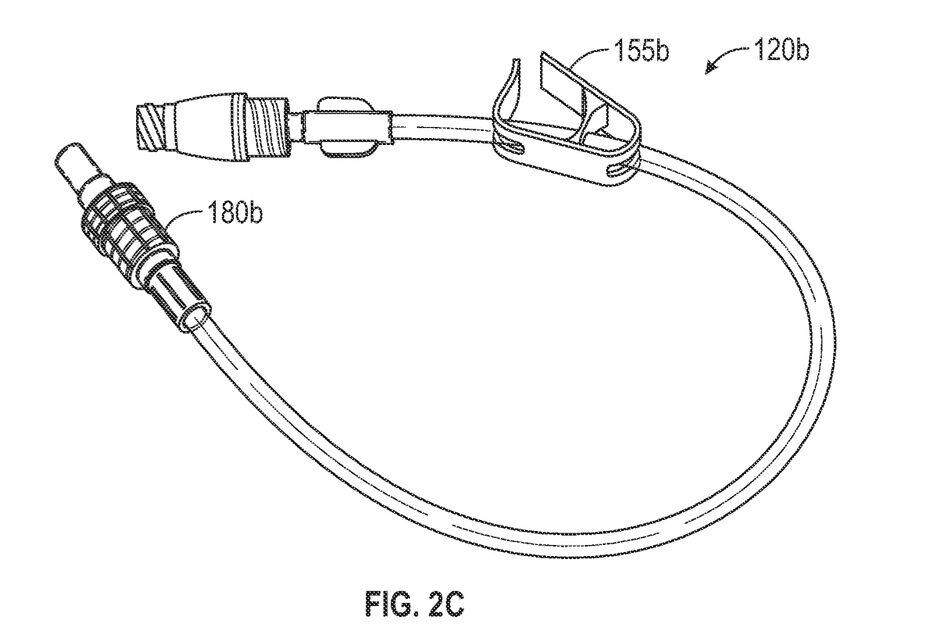

Typically, medical fluid administration sets have more parts than are shown in FIG. 1, such as those shown in FIGS. 2A-2C. Infusion sets may be formed from any combination of infusion components and tubing. Typically, the infusion components and tubing are disposable products that are used once and then discarded. The infusion components and tubing may be formed from any suitable material (e.g., plastic, silicone, rubber), many or all of which are clear or translucent so that the fluid flow or levels inside can be seen.

As shown in FIGS. 2A, an infusion set 120 may include a drip chamber 130, a check valve 140 and a roller clamp 150 connected together by tubing 160. The infusion set 120 may also include a Y-site 170 having a Y-shaped junction with a needleless connector 175, as well as a luer lock connector 180 at the end of the infusion set 120. The luer lock connector 180 may be used for connection to a catheter inserted into a patient, for example. The infusion set 120 may include additional infusion components and may be formed of any combination of components and the tubing 160.

As shown in FIG. 2B, an IV extension set 120a may be used to connect any two infusion components or devices, such as IV sets, infusion pumps, syringe pumps and the like. IV extension set 120a includes a luer connector 180a and a flow controller 155a. Similarly, as shown in FIG. 2C, another IV extension set 120b includes a luer connector 180b and a flow controller 155b.

Figure 3:
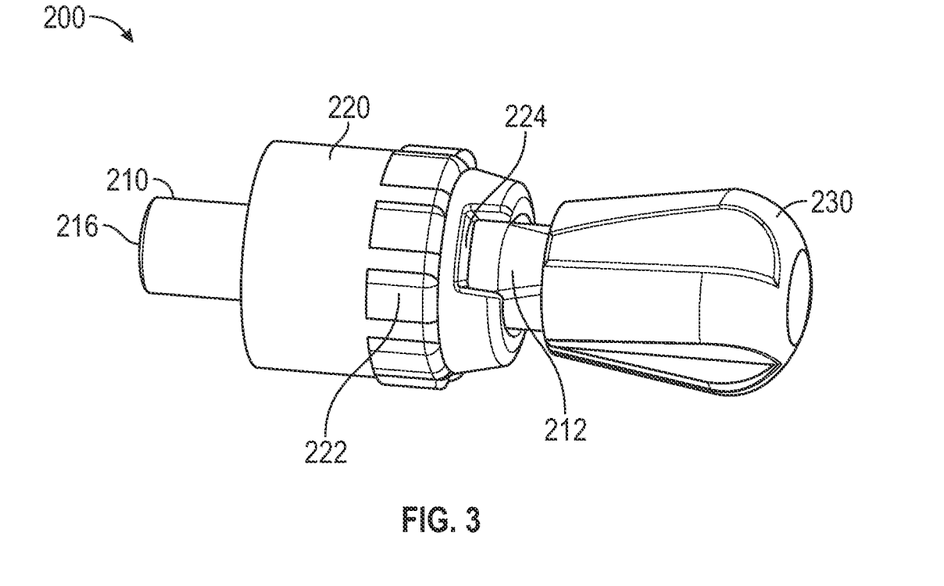
FIG. 3 depicts a side perspective view of a male luer connector, according to aspects of the disclosure.
Figure 4:
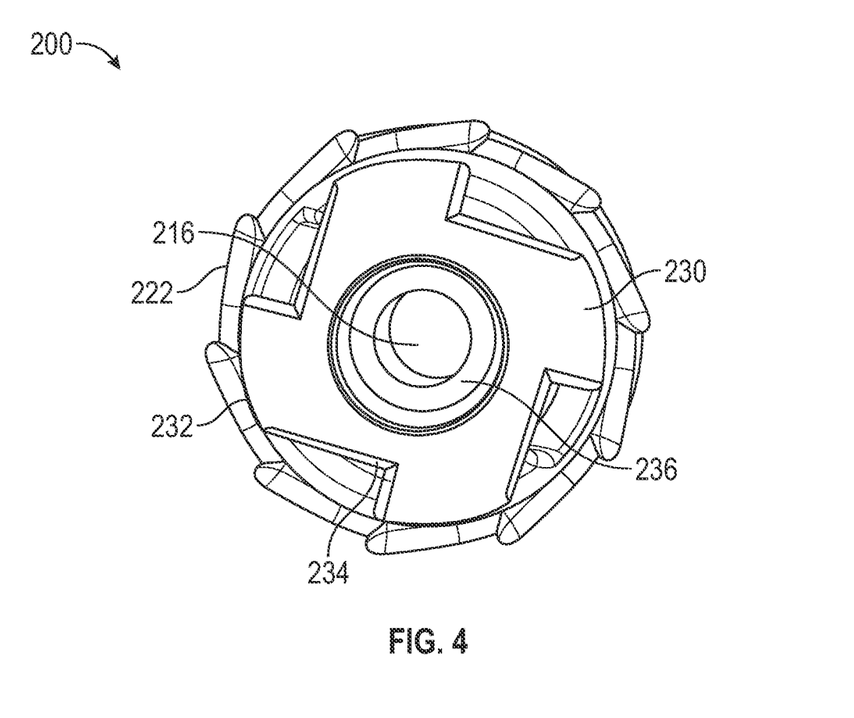
FIG. 4 depicts a front perspective view of the male luer connector of FIG. 3, according to aspects of the disclosure.

As shown in FIGS. 3 and 4, a male luer connector 200 is provided according to aspects of the disclosure. Male luer connector 200 has a luer slip 210 (e.g., inner core) formed from a hard material, such as polycarbonate, nylon, polyethylene, and the like. The luer slip 210 may mate with a standard female receptacle of an infusion set device or component (e.g., female luer connector, female needle free port, female catheter set, female pump port) that is configured to connect with a male luer connector. The luer slip 210 may have a hollow portion forming a lumen 216, the lumen 216 forming a flow path that extends through the length of the luer slip 210.

A collar 220 is disposed around the luer slip 210, the collar 220 being formed of any suitable material. For example, the collar 220 may be formed from a hard material, such as polycarbonate, nylon, polyethylene, and the like, similar to the luer slip 210. As another example, the collar 220 may be formed of a material that is soft and cushioned, such as silicone, polyurethane, a latex free silicone rubber, and the like, or any combination thereof. In this case, the soft cushioning property of the collar 220 may allow the luer connector 200 to be pressed against a patient's skin for a prolonged period of time without causing skin tears or pressure sores.

The collar 220 may be latex free, providing for use in a wide range of medical applications, including those that proscribe latex contact with the patient's skin (e.g., patient has latex allergy). The collar 220 may be slip resistant when wet and may be formed to hold up to gas sterilization and gamma sterilization.

The collar 220 may be slidingly coupled to the luer slip 210. Here, the coupling between the collar 220 and the luer slip 210 may be configured to provide an optimal travel length of the collar 220 with respect to the luer slip 210. Such an optimal travel length may enable the luer slip 210 to be fully engaged with a female connector (e.g., female luer connector 300 shown in FIG. 5) before the collar 220 contacts the female connector, while providing the ability to maintain a firm grip on the male luer connector 200. For example, the optimal travel length may ensure a leakage free connection to the female connector. As another example, the optimal travel length may give the user (e.g., healthcare provider, clinician) more space to clean the luer slip 210.

The collar 220 may be textured and/or contoured to provide for an improved grip when the male luer connector 200 is to be loosened or tightened. For example, as shown in FIGS. 3 and 4, the collar 220 may have multiple raised features 222, such as the angled projections with rounded leading edges as shown, which may provide texturing for non-slip and/or easy grip properties (e.g., grip features). The raised features 222 may be any suitable feature, such as ridges or other raised areas, for example.

The collar 220 may also include one or more notches 224. The notch 224 may provide a click feature where the notch 224 of collar 220 engages on an appropriately sized and shaped protrusion 212 of the luer slip 210 to disconnect. Notch 224 may be formed in any suitable size and shape to vary and/or realize the click feature. For example, the notch 224 may have a slanted notch design that may enable a strong biting force to minimize or avoid slipping of the collar 220 while being disconnected from the female connector. The click feature in combination with the optimal travel length may enable a user to disconnect the male luer connector 200 in one motion with finger placement on the collar 220 while avoiding sudden ejection of the male luer connector 200, which may make the operation of the male luer connector 200 more stable.

Male luer connector 200 may also include a grip 230. Grip 230 may be sized and shaped in any suitable manner, such as a tapered tear drop shape as shown. The tear drop shape of grip 230 may provide for the comfortable use of a strong pulling force by a user. For example, a strong pulling force may be required for regular disconnection of the male luer connector 200, or when the luer slip 210 is stuck inside the female connector due to the use of disinfectant. Also, in the process of connecting the male luer connector 200 to a female connector, the wider portion of the tear drop shape of the grip 230 is configured to sit comfortably between a user's fingers so that the grip 230 does not cause pressure points on the fingers.

The grip 230 may be formed of any suitable material. For example, the grip 230 may be formed from a hard material, such as polycarbonate, nylon, polyethylene, and the like, similar to the luer slip 210. Here, the grip 230 and the luer slip 210 may be formed as an integral component (e.g., molding). As another example, the grip 230 may be formed of a material that is soft and cushioned, such as silicone, polyurethane, a latex free silicone rubber, and the like, or any combination thereof. In this case, material of the grip 230 may be overmolded or otherwise adhered to the luer slip 210 and the soft cushioning property of the grip 230 may allow the luer connector 200 to be pressed against a patient's skin for a prolonged period of time without causing skin tears or pressure sores.

The grip 230 may be latex free, providing for use in a wide range of medical applications, including those that proscribe latex contact with the patient's skin (e.g., patient has latex allergy). The grip 230 may be slip resistant when wet and may be formed to hold up to gas sterilization and gamma sterilization.

A combination of the click feature, the optimal travel length and the tear drop shape of the grip 230 may provide for a one hand placement to twist and pull the male luer connector 200. For example, a user may have a single hand or finger placement on the male luer connector 200 while both twisting and pulling at the same time, thus allowing for an efficient disconnection of the male luer connector 200.

The grip 230 may have grip features 232 defined by recesses 234, thus providing a throwing star shape to the grip 230 as shown in FIG. 4. This throwing star shape may provide for a high disconnecting gripping force to be applied by a user while reducing the potential for over-torqueing or over-connecting the male luer connector 200. The grip 230 may also have a fluid port 236 that is fluidly coupled to the luer slip 210. The fluid port 236 may be configured to receive an IV tube (e.g., tubing 160) that is connected to an IV component or fluid source. In use, fluid may flow into the fluid port 236, through the male luer connector 200 and out an opposing end of the luer slip 210, or vice versa.

Figure 5:
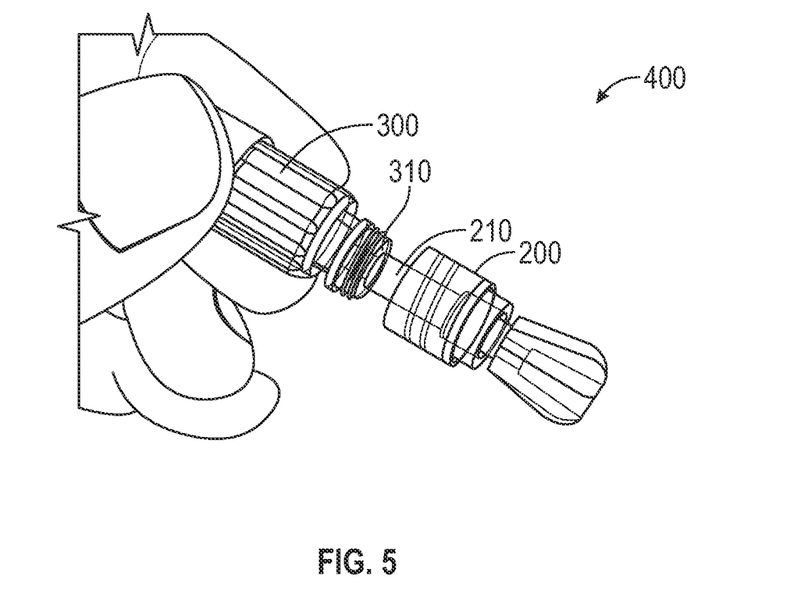
FIG. 5 depicts a perspective view of a luer connector assembly, according to aspects of the disclosure.

FIG. 5 shows an example luer connector assembly 400, which includes the male luer connector 200 and a female luer connector 300. Here, the luer slip 210 of the male luer connector 200 engages or mates with a female port 310 of the female luer connector. For example, one of the male luer connector 200 and the female luer connector 300 may connect via IV tubing to an IV set (e.g., IV set 120) and the other of the male luer connector 200 and the female luer connector 300 may connect via IV tubing to a catheter inserted in a patient. Thus, the male luer connector 200 of the luer connector assembly 400 provides for easy one-handed connection to or disconnection from the female luer connector 300 for quick connection/disconnection of the IV set 120 and the catheter. As another example, a luer connector assembly 400 may be used between a fluid source (e.g., fluid supply 38) and a receiving end of the IV set 120 (e.g., drip chamber 130), thus providing for quick and easy connection/disconnection between the fluid supply 38 and the IV set 120.

Figure 6:
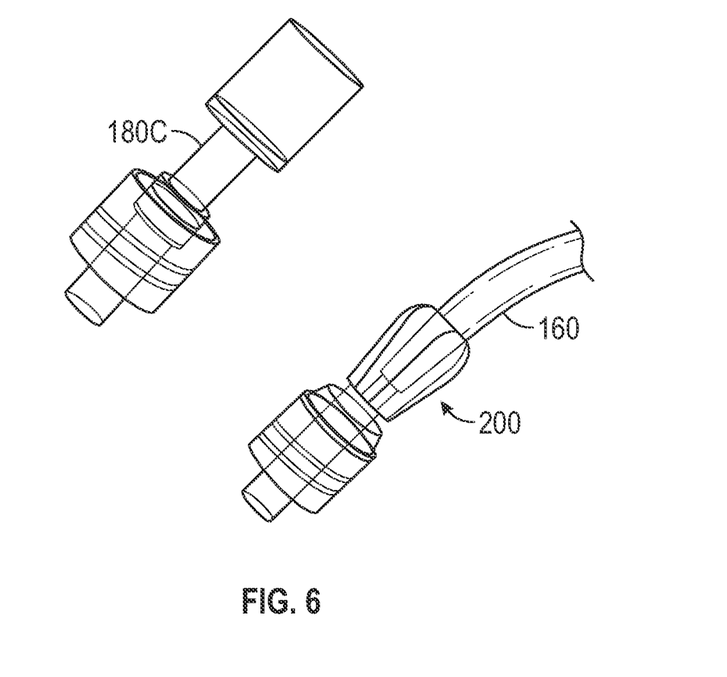
FIG. 6 depicts a perspective view of a male luer connector coupled to an IV tube beside a typical male luer connector, according to aspects of the disclosure.

As shown in FIG. 6, the male luer connector 200 may be compact with a minimized size in comparison to a typical male luer connector 180c. For example, the male luer connector 200 is about one half the volume of the typical male luer connector 180c, while the combination of the above described features provides for stronger performance of the male luer connector 200 over the typical male luer connector 180c. Here, this size difference between the male luer connector 200 and the typical male luer connector 180c provides for reducing the material (e.g., resin) cost of the male luer connector 200 by half due to using half the volume of material. Also, the reduced size of the male luer connector 200 may be more comfortable on patients, which may be especially important for infants or babies in a neonatal intensive care unit (NICU) or a premature intensive care unit (PICU).

In aspects of the disclosure, male luer connector 200 may be formed in any suitable manner. For example, the luer slip 210 and the grip 230 may be molded as an integral component, while the collar 220 may be molded as a separate component, after which the collar 220 may be slidable mounted onto the luer slip 210. As another example, the luer slip 210 and the grip 230 may be separate components where the grip 230 may be overmolded, welded or affixed by adhesive to the luer slip 210. The luer slip 210, the collar 220 and the grip 230 may be formed from any combination of transparent materials, translucent materials and/or opaque materials.

In one or more embodiments of the disclosure, a male luer connector comprises a luer slip comprising a first material, the luer slip sized and shaped to mate with a female connector; a collar disposed on an outer surface of the luer slip, the collar comprising a second material and a plurality of first grip features disposed on an outer surface of the collar; and a grip coupled to the luer slip, the grip comprising a third material and a plurality of second grip features disposed on an outer surface of the grip, wherein one of the plurality of first and second grip features are configured to provide a slip resistant grip surface.

In aspects of the disclosure, the first and third materials are the same and the luer slip and the grip are an integrally formed component. In aspects of the disclosure, the first and third materials are different and the grip is molded onto the luer slip. In aspects of the disclosure, the luer slip is formed from a hard material comprising at least one of polycarbonate, nylon and polyethylene. In aspects of the disclosure, the luer slip comprises a male mating portion configured to sealingly mate with a female connector. In aspects of the disclosure, one of the second material and the third material is a soft material comprising at least one of silicone, polyurethane and latex free silicone rubber. In aspects of the disclosure, one of the collar and the grip is latex free. In aspects of the disclosure, one of the collar and the grip is configured to withstand gas sterilization. In aspects of the disclosure, one of the collar and the grip is configured to withstand gamma ray sterilization.

In aspects of the disclosure, the plurality of first grip features comprises raised features disposed on an outer surface of the collar. In aspects of the disclosure, the plurality of second grip features are defined by a plurality of recesses disposed in an outer surface of the grip. In aspects of the disclosure, the grip is tear shaped. In aspects of the disclosure, the grip comprises a throwing star configuration. In aspects of the disclosure, the collar comprises a notch sized and shaped to receive a protrusion disposed on an outer surface of the luer slip. In aspects of the disclosure, the luer slip comprises a lumen disposed through an axial length of the luer slip, and wherein the grip comprises a fluid port fluidly coupled to the lumen. In aspects of the disclosure, the fluid port is configured to receive intravenous tubing.

In one or more embodiments of the disclosure, an infusion set comprises an infusion set component and a male luer connector. The male luer connector comprises a luer slip comprising a lumen disposed along an axial length of the luer slip, the luer slip sized and shaped to mate with a female connector; a collar disposed on an outer surface of the luer slip, the collar comprising a notch and a plurality of first grip features disposed on an outer surface of the collar; and a tear shaped grip coupled to the luer slip, the grip comprising a fluid port fluidly coupled to the lumen and a plurality of second grip features disposed on an outer surface of the grip.

In aspects of the disclosure, the second grip features are defined by a plurality of recesses disposed in an outer surface of the grip, and wherein the second grip features define a throwing star configuration. In aspects of the disclosure, the notch of the collar is sized and shaped to receive a protrusion disposed on an outer surface of the luer slip.

In one or more embodiments of the disclosure, an infusion set luer connector assembly comprises a female luer connector and a male luer connector. The female luer connector comprises a receiving portion; a first fluid port configured to receive intravenous tubing; and a lumen fluidly coupled between the receiving portion and the first fluid port. The male luer connector comprises a luer slip comprising a lumen disposed along an axial length of the luer slip, the luer slip sized and shaped to mate with the receiving portion of the female luer connector; a collar disposed on an outer surface of the luer slip, the collar comprising a notch and a plurality of first grip features disposed on an outer surface of the collar; and a tear shaped grip coupled to the luer slip, the grip comprising a second fluid port fluidly coupled to the lumen and configured to receive intravenous tubing, and a plurality of second grip features disposed on an outer surface of the grip in a throwing star configuration.

It is understood that any specific order or hierarchy of blocks in the methods of processes disclosed is an illustration of example approaches. Based upon design or implementation preferences, it is understood that the specific order or hierarchy of blocks in the processes may be rearranged, or that all illustrated blocks be performed. In some implementations, any of the blocks may be performed simultaneously.

The present disclosure is provided to enable any person skilled in the art to practice the various aspects described herein. The disclosure provides various examples of the subject technology, and the subject technology is not limited to these examples. Various modifications to these aspects will be readily apparent to those skilled in the art, and the generic principles defined herein may be applied to other aspects.

A reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

The word "exemplary" is used herein to mean "serving as an example or illustration." Any aspect or design described herein as "exemplary" is not necessarily to be construed as preferred or advantageous over other aspects or designs. In one aspect, various alternative configurations and operations described herein may be considered to be at least equivalent.

As used herein, the phrase "at least one of" preceding a series of items, with the term "or" to separate any of the items, modifies the list as a whole, rather than each item of the list. The phrase "at least one of" does not require selection of at least one item; rather, the phrase allows a meaning that includes at least one of any one of the items, and/or at least one of any combination of the items, and/or at least one of each of the items. By way of example, the phrase "at least one of A, B, or C" may refer to: only A, only B, or only C; or any combination of A, B, and C.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa.

As used herein, the terms "determine" or "determining" encompass a wide variety of actions. For example, "determining" may include calculating, computing, processing, deriving, generating, obtaining, looking up (e.g., looking up in a table, a database or another data structure), ascertaining and the like via a hardware element without user intervention. Also, "determining" may include receiving (e.g., receiving information), accessing (e.g., accessing data in a memory) and the like via a hardware element without user intervention. "Determining" may include resolving, selecting, choosing, establishing, and the like via a hardware element without user intervention.

As used herein, the terms "provide" or "providing" encompass a wide variety of actions. For example, "providing" may include storing a value in a location of a storage device for subsequent retrieval, transmitting a value directly to the recipient via at least one wired or wireless communication medium, transmitting or storing a reference to a value, and the like. "Providing" may also include encoding, decoding, encrypting, decrypting, validating, verifying, inserting and the like via a hardware element.

In one aspect, unless otherwise stated, all measurements, values, ratings, positions, magnitudes, sizes, and other specifications that are set forth in this specification, including in the claims that follow, are approximate, not exact. In one aspect, they are intended to have a reasonable range that is consistent with the functions to which they relate and with what is customary in the art to which they pertain.

It is understood that the specific order or hierarchy of steps, operations or processes disclosed is an illustration of exemplary approaches. Based upon design preferences, it is understood that the specific order or hierarchy of steps, operations or processes may be rearranged. Some of the steps, operations or processes may be performed simultaneously. Some or all of the steps, operations, or processes may be performed automatically, without the intervention of a user. The accompanying method claims, if any, present elements of the various steps, operations or processes in a sample order, and are not meant to be limited to the specific order or hierarchy presented.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112 (f) unless the element is expressly recited using the phrase "means for" or, in the case of a method claim, the element is recited using the phrase "step for." Furthermore, to the extent that the term "include," "have," or the like is used, such term is intended to be inclusive in a manner similar to the term "comprise" as "comprise" is interpreted when employed as a transitional word in a claim.

The Title, Background, Summary, Brief Description of the Drawings and Abstract of the disclosure are hereby incorporated into the disclosure and are provided as illustrative examples of the disclosure, not as restrictive descriptions. It is submitted with the understanding that they will not be used to limit the scope or meaning of the claims. In addition, in the Detailed Description, it can be seen that the description provides illustrative examples and the various features are grouped together in various embodiments for the purpose of streamlining the disclosure. This method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the Detailed Description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirement of 35 U.S.C. § 101, 102, or 103, nor should they be interpreted in such a way.

What is claimed is:

1. A male luer connector, comprising:
a luer slip comprising a first material, the luer slip sized and shaped to mate with a female connector;
a collar disposed on an outer surface of the luer slip, the collar comprising a second material and a plurality of first grip features disposed on an outer surface of the collar; and
a grip coupled to the luer slip, the grip comprising a third material and a plurality of second grip features disposed on an outer surface of the grip,
wherein one of the plurality of first and second grip features are configured to provide a slip resistant grip surface,
wherein the first and third materials are the same and the luer slip and the grip are singularly molded as an integrally formed component,
wherein the collar comprises a notch sized and shaped to receive a protrusion disposed on an outer surface of the luer slip.

2. The male luer connector of claim 1, wherein the luer slip and the grip are formed from a hard material comprising at least one of polycarbonate, nylon and polyethylene.

3. The male luer connector of claim 1, wherein the luer slip comprises a male mating portion configured to sealingly mate with a female connector.

4. The male luer connector of claim 1, wherein one of the second material and the third material is a soft material comprising at least one of silicone, polyurethane and latex free silicone rubber.

5. The male luer connector of claim 1, wherein one of the collar and the grip is latex free.

6. The male luer connector of claim 1, wherein one of the collar and the grip is configured to withstand gas sterilization.

7. The male luer connector of claim 1, wherein one of the collar and the grip is configured to withstand gamma ray sterilization.

8. The male luer connector of claim 1, wherein the plurality of first grip features comprises raised features disposed on an outer surface of the collar.

9. The male luer connector of claim 1, wherein the plurality of second grip features are defined by a plurality of recesses disposed in an outer surface of the grip.

10. The male luer connector of claim 1, wherein the grip is tear shaped.

11. The male luer connector of claim 1, wherein the grip comprises a throwing star configuration.

12. The male luer connector of claim 1, wherein the luer slip comprises a lumen disposed through an axial length of the luer slip, and wherein the grip comprises a fluid port fluidly coupled to the lumen.

13. The male luer connector of claim 12, wherein the fluid port is configured to receive intravenous tubing.

14. An infusion set, comprising:
an infusion set component; and
a male luer connector, the male luer connector comprising:
a luer slip comprising a lumen disposed along an axial length of the luer slip, the luer slip sized and shaped to mate with a female connector;
a collar disposed on an outer surface of the luer slip, the collar comprising a notch and a plurality of first grip features disposed on an outer surface of the collar; and
a tear shaped grip coupled to the luer slip, the grip comprising a fluid port fluidly coupled to the lumen and a plurality of second grip features disposed on an outer surface of the grip,
wherein the luer slip and the tear shaped grip are singularly molded from the same material as an integrally formed component.

15. The infusion set of claim 14, wherein the second grip features are defined by a plurality of recesses disposed in an outer surface of the grip, and wherein the second grip features define a throwing star configuration.

16. The infusion set of claim 14, wherein the notch of the collar is sized and shaped to receive a protrusion disposed on an outer surface of the luer slip.

17. An infusion set luer connector assembly, comprising:
a female luer connector, comprising:
a receiving portion;
a first fluid port configured to receive intravenous tubing; and
a lumen fluidly coupled between the receiving portion and the first fluid port; and
a male luer connector, comprising:
a luer slip comprising a lumen disposed along an axial length of the luer slip, the luer slip sized and shaped to mate with the receiving portion of the female luer connector;
a collar disposed on an outer surface of the luer slip, the collar comprising a notch and a plurality of first grip features disposed on an outer surface of the collar; and
a tear shaped grip coupled to the luer slip, the grip comprising a second fluid port fluidly coupled to the lumen and configured to receive intravenous tubing, and a plurality of second grip features disposed on an outer surface of the grip in a throwing star configuration,
wherein the luer slip and the tear shaped grip are singularly molded from the same material as an integrally formed component.

* * * * *